Patented Nov. 17, 1942

2,302,363

UNITED STATES PATENT OFFICE 2,302,363

ARTIFICIAL RESIN AND A PROCESS FOR THE MANUFACTURE OF THE SAME

August Bellefontaine, Krefeld-Uerdingen, Germany; vested in the Alien Property Custodian No Drawing. Application November 17, 1938, Serial No. 240,959. In Germany November 29, 1937

18 Claims. (Cl. 260—47)

This invention relates to artificial resins and a process for the manufacture of the same.

According to the present invention polyhydric phenols with one or more nuclei containing unsaturated aliphatic groups on heating are converted into resins of valuable technical properties.

The unsaturated aliphatic groups, such as the allyl or crotyl group, or equivalent substituted allyl or crotyl groups may be attached to the phenolic oxygen atom to form ethers or to carbon atoms of the aromatic nucleus or both. Such polyhydric phenols are obtained by the action of allyl chloride or substituted allyl chlorides, such as the 2-methyl allyl chloride, or of butadiene or crotylchloride respectively on polyhydric phenols or their alkali salts and if desired subsequent rearrangement of the phenol ethers first formed.

Among the polyhydric phenols which are suitable for the manufacture of starting materials for the process of the present invention may be mentioned pyrocatechol, resorcinal, hydroquinone, 1,2-dihydroxy-naphthalene, 1,7-dihydroxy-naphthalene, 1,2-dihydroxy-diphenyl and particularly those phenols which contain hydroxyl groups on at least two different nuclei, as for example dihydroxy-diphenyls, dihydroxy-naphthalenes, dihydroxy-diphenyl methanes and other polyhydroxy-polyphenyl paraffins, such as the dihydroxy-diphenyl propane, polyhydroxy-polyphenyl-cyclo-paraffins, such as the dihydroxy-diphenyl-cyclohexane and polyhydroxy-polyphenyl olefines, such as the dihydroxy-stilbene. These or other polyhydric phenols can first be converted in the manner known per se into their allyl or crotyl ethers, which compounds at elevated temperature, for example on distillation, are rearranged into nuclear substituted allyl phenols or crotyl phenols.

The latter undergo on heating conversion to the resins. The heating temperature may vary according to the conditions. I have obtained good results at temperatures from about 180° to about 500° C. and especially from about 240° to about 350° C., the upper temperature limit being determined by the decomposition point of the substituted polyhydric phenols or the resulting resins respectively obtained. The time of heating required depends on the special nature of the substituted polyhydric phenol and on the temperature degree employed.

The manufacture and rearrangement of the phenol ethers need not constitute separate processes, for it is possible also in one operation to proceed immediately to the new resin-like compounds. Likewise it is possible to proceed from such polyhydric phenols as contain on the aromatic nucleus allyl or crotyl radicles, such as di-(allyl-phenol)-methane or di-(crotyl-phenol)-methane which are not produced by way of the allyl or crotyl ethers but by way of Friedel-Crafts synthesis or otherwise. Also such compounds are applicable in which the number of the allyl or crotyl radicles or equivalent substituted allyl or crotyl radicles is smaller or larger than the number of phenolic hydroxyl groups, being however in all cases at least equal to two, such as tetra-allyl-dihydroxy-diphenyl propane.

The properties of the resins obtained are dependent upon the nature of the polyhydric phenol employed, the number and nature of the allyl or crotyl radicles present on the temperature employed in the resinification and the duration of heating. With increasing resinification temperature the solubility in solvents is reduced and the hardness increased. Aliphatic side chains operate in such a manner that with increasing number and number of carbon atoms thereof the resins produced under otherwise similar conditions become softer and more easily soluble in hydrocarbons.

The product obtained according to this invention may be employed in the manner known in the art of synthetic resins, for example for moulding purposes.

The invention is illustrated by the following examples without being restricted thereto. The parts are by weight:

*Example 1*

Into a solution of 912 parts by weight of 4.4'-dihydroxy-diphenyl-dimethyl methane in 2000 parts by weight of 16% caustic soda lye are allowed to drop at 40–45° C., with stirring 608 parts by weight of allyl chloride. After the addition the mixture is heated for two hours at 80° C. The reaction mixture is then washed four times with water and distilled in vacuum. The distillate which passes over almost completely between 200 and 230° C. under 1–2 mm. contains in part the diallyl-ether of 4.4'-dihydroxy-diphenyl-dimethyl methane, in part the 3.3'-diallyl-4.4'-dihydroxy-diphenyl-dimethyl methane and probably also the mono-allyl-ether of 3-allyl-4.4'-dihydroxy-diphenyl-dimethyl methane.

By heating this distillate to temperatures lying between 240 and 340° C. there are obtained progressively different polymerisates in the form of soft to hard, fusible to infusible resins of yellowish color, as is seen from the following table:

| Period of heating | Temperature | Consistency of the resin |
|---|---|---|
| | °C. | |
| 4 hours | 240 | Soft, fusible. |
| Do | 260 | Hard, somewhat sticky, fusible. |
| Do | 280 | Hard, dry, fusible. |
| ½ hour | 310 | Hard, infusible. |
| 8 hours | 250 | Hard, fusible. |

*Example 2*

A distillate of a boiling range of 200–240° C. under 1–2 mm. produced in a similar manner to that described in Example 1 from 4.4'-dihydroxy-diphenyl-dimethyl methane and crotyl chloride is heated to temperatures between 240 and 350° C. Thereby resins are produced which are softer than those obtained from the corresponding diallyl-compound.

| Period of heating | Temperature | Consistency of the resin |
|---|---|---|
| | °C. | |
| 4 hours | 240 | Soft, fusible. |
| Do | 260 | Do. |
| Do | 280 | Hard, sticky, fusible. |

*Example 3*

The 1.1-di-(4-hydroxy-phenyl)-cyclohexane obtainable from cyclohexanone and phenol is caused to react corresponding to the method of working described in Example 1. The diallyl ether first produced becomes rearranged on heating to 180–200° C. into the compound allylated in the nucleus and is converted on heating at about 260° C. for 4 hours.

In Examples 1–3 the specified dihydroxy-diphenyl-methane derivatives can be replaced by the corresponding nuclear methylated compounds obtainable from ketones and o- or m-cresol. Moreover the starting material in Example 3 can be produced by condensation of methyl or dimethyl cyclohexanone with phenol or cresols.

*Example 4*

A mixture of resorcinol diallyl ether with nuclear-substituted allyl derivatives of resorcinol, obtained by allylation of resorcinol and boiling under 1–2 mm. pressure at 150–165° C. gives a resilient resin on heating 10 minutes longer to about 260° C.

*Example 5*

1.7-dihydroxy-naphthalene is treated in alcoholic solution with alkali and allyl chloride. The diallyl ether is converted by heating at a temperature of about 200° C. into a brittle resin in a violent reaction.

*Example 6*

4.4-dihydroxy-diphenyl-sulphone is converted into the corresponding diallyl ether. On heating to 200° C. resinification takes place, in a brisk reaction.

I claim:
1. Process of resinifying a polyhydric phenol at least two hydrogen atoms of which are replaced by a radical selected from the group consisting of an allyl radical and a crotyl radical which comprises heating said polyhydric phenol at a temperature of from about 180 to about 500° C.

2. Process of resinifying a polyhydric phenol at least two hydrogen atoms of the nucleus of which are replaced by a radical selected from the group consisting of an allyl radical and a crotyl radical which comprises heating said polyhydric phenol at a temperature of from about 180 to about 500° C.

3. Process of resinifying a polyhydric phenol at least one hydrogen atom of the hydroxyl groups and at least one hydrogen atom of the nucleus of which are replaced by a radical selected from the group consisting of an allyl radical and a crotyl radical which comprises heating said polyhydric phenol at a temperature of from about 180 to about 500° C.

4. Process of resinifying a polyhydric phenol containing hydroxyl groups on at least two different nuclei and at least two hydrogen atoms of which are replaced by an allyl radical which comprises heating said polyhydric phenol at a temperature from about 240 to about 350° C.

5. Process of resinifying a polyhydric phenol containing hydroxyl groups on at least two different nuclei and at least two hydrogen atoms of at least one nucleus of which are replaced by an allyl radical which comprises heating said polyhydric phenol at a temperature of from about 240° C. to about 350° C.

6. Process of resinifying diallyl-dihydroxy-dimethyl-diphenyl methane which comprises heating said compound at a temperature of from about 240 to about 310° C.

7. Process of resinifying diallyl-dihydroxy-diphenyl-cyclohexane which comprises heating said compound at a temperature of about 260° C.

8. Process of resinifying a polyhydric phenol containing hydroxyl groups on at least two different nuclei and at least two hydrogen atoms of which are replaced by a crotyl radical which comprises heating said polyhydric phenol at a temperature of from about 240 to about 350° C.

9. Process of resinifying a polyhydric phenol containing hydroxyl groups on at least two different nuclei and at least two hydrogen atoms of at least one nucleus of which are replaced by a crotyl radical which comprises heating said polyhydric phenol at a temperature of from about 240 to about 350° C.

10. Process of resinifying dicrotyl-dihydroxy-diphenyl-dimethyl methane which comprises heating said compound at a temperature of from about 240 to about 350° C.

11. An artificial resin obtained in accordance with the process of claim 1.
12. An artificial resin obtained in accordance with the process of claim 4.
13. An artificial resin obtained in accordance with the process of claim 5.
14. An artificial resin obtained in accordance with the process of claim 6.
15. An artificial resin obtained in accordance with the process of claim 7.
16. An artificial resin obtained in accordance with the process of claim 8.
17. An artificial resin obtained in accordance with the process of claim 9.
18. An artificial resin obtained in accordance with the process of claim 10.

AUGUST BELLEFONTAINE.